United States Patent
Nuopponen

(10) Patent No.: US 9,909,256 B2
(45) Date of Patent: Mar. 6, 2018

(54) METHOD FOR FIBRILLATION OF CELLULOSE AND FIBRIL CELLULOSE PRODUCT

(71) Applicant: UPM-KYMMENE CORPORATION, Helsinki (FI)

(72) Inventor: Markus Nuopponen, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 475 days.

(21) Appl. No.: 14/378,410

(22) PCT Filed: Feb. 13, 2013

(86) PCT No.: PCT/FI2013/050162
§ 371 (c)(1),
(2) Date: Aug. 13, 2014

(87) PCT Pub. No.: WO2013/121108
PCT Pub. Date: Aug. 22, 2013

(65) Prior Publication Data
US 2015/0034263 A1 Feb. 5, 2015

(30) Foreign Application Priority Data
Feb. 13, 2012 (FI) .................................... 20125157

(51) Int. Cl.
*D21C 9/00* (2006.01)
*D21H 11/20* (2006.01)
(Continued)

(52) U.S. Cl.
CPC ............... *D21C 9/007* (2013.01); *C08L 1/04* (2013.01); *C08L 1/286* (2013.01); *D21H 11/18* (2013.01); *D21H 11/20* (2013.01)

(58) Field of Classification Search
CPC ........ D21C 9/007; D21C 9/002; D21C 9/004; D21C 9/005
See application file for complete search history.

(56) References Cited

U.S. PATENT DOCUMENTS

| | | | |
|---|---|---|---|
| 4,374,702 A | 2/1983 | Turbak et al. | |
| 4,481,077 A | 11/1984 | Herrick | |

(Continued)

FOREIGN PATENT DOCUMENTS

| | | |
|---|---|---|
| WO | WO 00/47628 A2 | 8/2000 |
| WO | WO 2010/042647 A2 | 4/2010 |

OTHER PUBLICATIONS

Atrex, Atrex-G-Series [downaloded from www.megatrex.com], dlownloaded on Jun. 30, 2017.*

(Continued)

*Primary Examiner* — Anthony Calandra
(74) *Attorney, Agent, or Firm* — Nixon Peabody LLP

(57) ABSTRACT

A method for fibrillation of cellulose includes the following steps: introducing fiber pulp of anionic cellulose at a consistency of 1 to 4% into a homogenizer, and homogenizing fiber pulp in the homogenizer at a pressure of 200 to 1000 bar, advantageously 300 to 650 bar, and by using 2 to 4 passes through for the same fiber pulp under these conditions, and after passes through, taking pulp from the homogenizer, which pulp has been fibrillated by homogenization to a degree than can be expressed as Brookfield viscosity exceeding 10,000 mPa·s (consistency 0.8%, 10 rpm).

15 Claims, 3 Drawing Sheets

(51) Int. Cl.
*D21H 11/18* (2006.01)
*C08L 1/04* (2006.01)
*C08L 1/28* (2006.01)

(56) References Cited

U.S. PATENT DOCUMENTS

| | | |
|---|---|---|
| 5,964,983 A | 10/1999 | Dinand et al. |
| 6,602,994 B1 | 8/2003 | Cash et al. |
| 9,365,978 B2 * | 6/2016 | Heiskanen ............... C08K 3/34 |
| 2005/0236121 A1 * | 10/2005 | Kondo ...................... C08J 3/12 |
| | | 162/100 |
| 2011/0036522 A1 * | 2/2011 | Ankerfors .............. D21C 9/002 |
| | | 162/26 |
| 2012/0043039 A1 * | 2/2012 | Paltakari ................ D21H 11/18 |
| | | 162/157.6 |

OTHER PUBLICATIONS

Jul. 3, 2013 International Search Report issued in International Application No. PCT/FI2013/050162.
Besbes et al., "Nanofibrillated cellulose from TEMPO-oxidized eucalyptus fibres: Effect of the carboxyl content," Carbohydrate Polymers, 2011, vol. 84, pp. 975-983.
Jul. 3, 2013 Written Opinion issued in International Application No. PCT/FI2013/050162.
Reducing Size with a Microfluidizer, sponsored by Particle Sizing Systems, Jul. 13, 2016, https://www.azom.com/article.aspx?ArticleID=12998.

* cited by examiner

METHOD FOR FIBRILLATION OF CELLULOSE AND FIBRIL CELLULOSE PRODUCT

FIELD OF THE INVENTION

The present invention relates to a method for fibrillation of cellulose for the purpose of producing fibril cellulose. The invention also relates to a fibril cellulose product.

BACKGROUND OF THE INVENTION

It has been known to produce fibril cellulose from lignocellulosic fibres by the application of energy, which results in the fibrillation of the fibres. In this process, lignocellulosic fibres can be disintegrated into smaller parts by detaching fibrils which act as components in the fibre walls, wherein the particles obtained become significantly smaller in size. The properties of fibril cellulose thus obtained differ significantly from the properties of normal pulp. It is also possible to use fibril cellulose as an additive in papermaking and to increase the internal bond strength and tensile strength of the paper product, as well as to increase the compactness of the paper. Fibril cellulose also differs from pulp in its appearance, because it is gel-like material in which the fibrils are present in a water dispersion. Because of the properties of fibril cellulose, it has become a desired raw material, and products containing it would have several uses in industry, for example as an additive in various compositions.

Fibril cellulose can be isolated as such directly from the fermentation process of some bacteria (including *Acetobacter xylinus*). However, in view of large-scale production of fibril cellulose, the most promising potential raw material is raw material of plant origin and containing cellulose fibres, particularly wood. The production of fibril cellulose from wood raw material requires the decomposition of the fibres further to the size class of fibrils. In processing, a cellulose fibre suspension is passed several times through a homogenization step that generates high shear forces on the material. For example in U.S. Pat. No. 4,374,702, this is achieved by passing the suspension under high pressure repeatedly through a narrow gap where it achieves a high velocity, after which it impinges on an impact surface that decelerates the velocity. U.S. Pat. No. 4,481,077 discloses a method applying the homogenizer of said patent, wherein additives are admixed into the pulp before homogenization. The homogenization of fibre pulp consisting of a cellulose derivative, for the production of fibril cellulose is, in turn, known from U.S. Pat. No. 6,602,994.

In practice, compromises have to be made in the homogenization upon producing fibril cellulose: for good fibrillation, high input power/pulp flow rate is needed, which, in turn, decreases the productivity with the available homogenizer power. It is, for example, known to pass pulp several times through a homogenizer, to achieve a desired degree of fibrillation. Another problem with the processing of fibre-containing pulp is the susceptibility of homogenizers to clogging due to their structure, which may occur even at relatively low consistencies (1 to 2%), particularly if the starting pulp is not sufficiently well pre-processed. Attempts have been made to solve these problems, among other things, by reducing the fibre size in the starting pulp, for example by dry refining.

SUMMARY OF THE INVENTION

It is an aim of the invention to develop the homogenization method in such a way that a good degree of fibrillation can be obtained with starting pulps having a normal fibre size, while the yield is still good, in spite of said aims.

The fibre material to be processed is anionic cellulose. Such cellulose is chemically pre-processed, that is, chemically modified in such a way that anionic groups have been produced in the cellulose polymer chain (for example, catalytically oxidized cellulose or carboxymethylated cellulose) Fibres that contain such cellulose are also fibrillated more easily.

The final result can be influenced by the fibrillation conditions during the homogenization. The pH of the fibre suspension supplied to homogenization is in the neutral or slightly alkaline range, pH 6 to 9, advantageously 7 to 8. If desired, the pulp to be homogenized can also be pre-heated.

The homogenization pressure applied during the homogenization is 200 to 1000 bar, advantageously 300 to 650 bar, and the homogenization consistency is 1.5 to 3.5%. With these values, the pulp only needs to be passed 2 to 4 times through the homogenizer, and in this way a viscosity of at least 10,000 mPa·s (Brookfield, measuring consistency of 0.8%) can be achieved for the product obtained. The number of passes through can be influenced by possible mechanical pre-processing of the pulp to be homogenized, when the aim is a given viscosity level.

Advantageously, a pressure between 300 and 650 bar and a consistency between 1.5 and 3.5% are used. It has been found that increasing the pressure does not crucially improve the homogenization result with respect to the quality of the product, but it may overload the homogenizer and cause wearing. In said pressure range, the number of passes through (normally 2 to 4) can be influenced by the selection of the pressure in such a way that at a higher homogenizing pressure, fewer passes are needed, when the aim is a given quality. Similarly, it has been found that decreasing the consistency from the value of 2% to the value of 1% does not improve the results in view of the quality (viscosity etc.) of the product but impairs the output of the process. With the consistency values of 1.5 to 3.5%, good quality is achieved without a susceptibility to clogging and with a good production capacity.

According to yet another advantageous embodiment, the pressure of 300 to 650 bar and the consistency of 1.5 to 2.5% are used for the homogenization of oxidized pulp (for example, catalytically oxidized by N-oxyl mediated oxidation). With these values, good results can be achieved with only 2 to 4 passes without needing to use low-consistency pulp, wherein the productivity of the process calculated as dry substance is improved, and good quality (good viscosity level) is simultaneously secured.

The homogenization consistency can be optimized to the range of 2 to 3%, if no susceptibility to clogging of the homogenizer used is detected with these consistencies.

The starting pulp used is pulp which has been modified to be anionic and which has preserved its fibre size in the chemical modification. Such anionic modified pulp can be dispersed in water to a given consistency (homogenization consistency), at which the homogenization is carried out.

The anionic modified pulp may be oxidized pulp, in which the glucose units of cellulose contain anionic carboxyl groups as a result of the oxidation. One way of obtaining carboxyl groups in cellulose is N-oxyl mediated catalytic oxidation by using a suitable N-oxyl catalyst which oxidizes primary alcohol groups of glucose units to carboxyl groups, for example 2,2,6,6-tetramethyl-1-piperidine N-oxide (TEMPO). The acid number of the starting material to be homogenized, characterizing the number of carboxyl groups in cellulose, is between 0.6 and 1.2 mmol/g, advantageously between 0.9 and 1.1 mmol/g.

According to another embodiment, the anionic modified pulp may be carboxymethylated (CM). It is carboxymethylated cellulose which has maintained its fibre structure and forms a fibrous dispersion in water. The substitution of such CM cellulose can be represented by the charge level (number of CM groups) of 0.6 to 1.2 mmol/g.

The invention is also suitable for other anionic modified pulps, in which the hydrogen bonds within the cellulose fibre have become weaker because of substituents contained in the cellulose molecules, and the pulp can be fibrillated more easily by mechanical work, in the same way as said oxidized pulp and CM cellulose. Thus, no pre-refining will be necessary to refine the fibres for homogenization.

DESCRIPTION OF THE DRAWINGS

In the following, the invention will be described with reference to the appended drawings, in which.

DETAILED DESCRIPTION OF THE INVENTION

Figure 1:
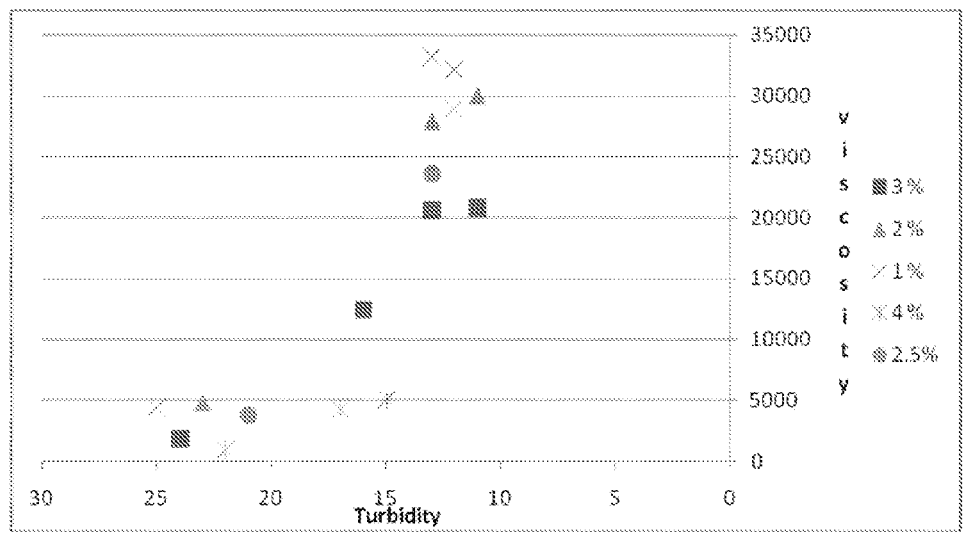
FIG. 1 shows the effect of homogenization consistency on the development of turbidity and viscosity at the same homogenization pressure, when the number of passes is increased.

In this description, the percentage values are given in percent by weight (wt-%, mass of a substance per total mass), unless otherwise indicated. Where the numeric values are given in a range, this range also includes the lower limit and upper limit indicated.

In this application, fibril cellulose refers to cellulose microfibrils or microfibril bundles separated from cellulose-based fibre raw material. These fibrils are characterized by a high aspect ratio (length/diameter): their length may exceed 1 µm, whereas the diameter typically remains smaller than 200 nm. The smallest fibrils are in the scale of so-called elementary fibrils, the diameter being typically 2 to 12 nm. The dimensions and size distribution of the fibrils depend on the refining method and efficiency. Fibril cellulose can be characterized as a cellulose based material, in which the median length of particles (fibrils or fibril bundles) is not greater than 10 µm, for example between 0.2 and 10 µm, advantageously not greater than 1 µm, and the particle diameter is smaller than 1 µm, suitably ranging from 2 nm to 200 nm. Fibril cellulose is characterized by a large specific surface area and a strong ability to form hydrogen bonds. In water dispersion, fibril cellulose typically appears as either light or almost colourless gel-like material. Depending on the fibre raw material, fibril cellulose may also contain small amounts of other wood components, such as hemicellulose or lignin. Often used parallel names for fibril cellulose include nanofibrillated cellulose (NFC), which is often simply called nanocellulose, and microfibrillated cellulose (MFC).

Homogenization is performed by subjecting a fibre suspension formed by the starting pulp, which is at a suitable consistency, to such a pressure that it flows at a high speed through a homogenizer; as a result, the fibres in the suspension are subjected to shearing and impact forces which result in fibrillation. The energy taken by this defibrillation work can be expressed in terms of specific energy consumption, that is, energy per processed raw material quantity, in units of e.g. kWh/kg, MWh/ton, or units proportional to these. Without restricting the described method, it is possible to say that the energy taken by homogenization in one pass is, depending on the consistency, in the order of 500 to 1000 MWh per ton of dry substance.

The homogenization is performed at a relatively low consistency for the mixture of anionized fibre raw material and water, the fibre suspension. In this context, the term pulp will also be used for the mixture of fibre raw material and water subjected to homogenization. The fibre raw material subjected to homogenization may refer to whole fibres, parts separated from them, fibril bundles, or fibrils, and typically the pulp is a mixture of such elements, in which the ratios between the components are dependent on the number of the homogenization repeat.

In this context, homogenization refers to homogenization caused by forced through-flow of fluid to be processed, wherein the material suspended in it is disintegrated into smaller parts. The method presented in this context is not limited to the use of a homogenizer of a given type. However, it can be stated that in homogenization, the fibre suspension is passed at a given pressure through a narrow through-flow gap where an increase in the linear velocity of the suspension and the subsequent impact on a surface causes shearing and impact forces on the suspension, resulting in the removal of fibrils from the fibre material. The through-flow gap is annular, and there are many alternatives for its profile (cross-section in the direction transverse to the plane of the annulus. The flow-through gap is encircled by an impact surface which is hit by the pulp coming at a high speed out of the gap, in the radial direction of the annulus. The disintegration of the material can also be influenced by the profile of the flow-through gap. The flow-through gap is in a structure called a homogenizing valve.

Also, without limiting the method, it can be stated that the pulp to be homogenized in the homogenizer is fed into the flow-through gap by a pump, wherein the homogenization pressure is the pressure developed in the pulp before the gap due to the resistance caused by the gap. This pressure can be adjusted by controlling the pressure at which said gap is pushed towards a closed position. The input power in the homogenizer is normally constant, wherein the volume flow (volume passed through per time) increases as the feeding pressure decreases.

The methods for measuring turbidity and viscosity will be presented briefly in the following.

Turbidity:

The turbidity can be measured quantitatively by optical methods operating by two different physical measuring methods: measuring the loss of intensity of light in a sample (turbidimetry), and measuring the emission of light scattered from particles of a sample (nephelometry).

Fibril cellulose is substantially transparent in an aqueous medium. More fibrillated materials have a lower turbidity expressed in NTU units (nephelometric turbidity units). Consequently, the measurement of turbidity suits particularly well for the characterization of fibril cellulose. In the measurements, HACH P2100 equipment was used. The sample was prepared by mixing a product quantity corresponding to a dry matter content of 0.5 g in water in such a way that the total amount became 500 g, after which the sample was divided into different measuring vessels for analysis. The measurement concentration is thus 0.1%. Before the measurement, the device is calibrated with standard samples.

Viscosity:

The viscosity of fibril cellulose was measured by Brookfield RVDV-III rotation viscosimeter by selecting a "vane spindle" sensor (number 73). The product was diluted with water to a consistency of 0.8 wt-%, and the sample was agitated for 10 min before the measurement. The temperature was adjusted to the range of 20° C.±1° C. A low rotation speed (10 rpm) was used.

Test runs on the invention will be discussed as follows.

The starting pulp in the first series of tests was bleached birch pulp, TEMPO oxidized by the standard method. The charge number of the starting pulp, describing the number of carboxyl groups (the same as acid number), was determined by conductometric titration, and it was 0.98 mmol/g.

The second starting pulp in the first series of tests was carboxymethylated pulp (CM pulp), charge 0.71 mmol/g.

In both cases, the numbers indicate in reality the number of carboxyl groups in modified pulp expressed as the unit of mmol/g of dry pulp.

Equipment:

GEA Niro soavi 3006L laboratory homogenizer.

Reference Equipment:

Atrex: "Atrex" mixer, model G30, diameter 500 mm, 6 rotor peripheries, rotation speed applied 1500 rpm (counter-rotating rotors).

Masuko: Masuko SuperMassColloider, model MKZA10-15J

Fluidizator: Fluidisator, Microfluidics M110Y

The results on the test runs of the first series of tests are given in the following table. The turbidity values were obtained by nephelometry from a sample at a consistency of 0.1%. The viscosity is Brookfield viscosity determined at a consistency of 0.8%, at the rotation speed of 10 rpm. "Yield" is the yield stress of the gel measured in connection with the Brookfield viscosity measurement; that is, the force, at which the gel starts to disintegrate.

| TEMPO | charge 0.98 mmol/g | NTU | Yield(Pa) | Brookfield (mPa · s) |
|---|---|---|---|---|
| Atrex | 6 pass 1% | 54 | | 9200 |
| | 4 pass 2% | 38 | | 7740 |
| GEA 600 bar | 2 pass 1% | 12 | 5 | 8460 |
| 600 bar | 2 pass 2% | 19 | 25 | 17000 |
| 1200 bar | 1 pass 3% | 13 | 10 | 7390 |
| Fluidizator | 1 pass 1.5% | 20 | 45 | 16301 |

| CM | charge 0.71 mmol/g | NTU | Yield(Pa) | Brookfield (mPa · s) |
|---|---|---|---|---|
| GEA 600 bar | 2 pass 1% | 43 | 58 | 30000 |
| | 4 pass 1% | 36 | 66 | 39000 |
| | 6 pass 1% | 35 | 81 | 34950 |
| | 2 pass 2% | 34 | 31 | 16590 |
| | 4 pass 2% | 31 | 62 | 27900 |
| | 6 pass 2% | 32 | 90 | 37350 |
| Masuko | 1 pass 2% | 62 | | 32620 |

From the results, it can be stated that in the case of oxidized cellulose (TEMPO), an increase in the homogenization viscosity from 1% to 2% improves the viscosity.

Particularly carboxymethyl cellulose (CM) can be homogenized by this method with excellent results, because at 1% and a pressure of 600 bar, even two passes are sufficient to achieve the desired fibrillation degree. Using carboxymethylated cellulose also gives higher yield stress values, i.e. a stronger gel. Similarly, with CM cellulose, it is even possible to achieve a Brookfield viscosity exceeding 35,000 mPa·s (2 passes 1% consistency 30,000 mPa·s, 4 passes 1% consistency 39,000 mPa·s), and a viscosity level exceeding 25,000 mPa·s can be achieved at a consistency of 2% with 4 passes. For production reasons, it is lucrative to try to run CM cellulose at consistencies higher than 1%. When running at a consistency of 2% with 2 passes, it is already possible to achieve a Brookfield viscosity exceeding 15,000 mPa·s, which is a good value in view of practical applications.

Because of inhomogeneity of the chemical modification method, carboxymethylated cellulose may contain fibre bundles in which the cellulose has been left unmodified or has been modified to a lower degree than the average degree of modification (degree of substitution), whereby these fibre bundles may clog the homogenizer. As a result, it may be necessary to carry out a mechanical pre-processing of the CM cellulose by subjecting the fibre suspension containing it to impacts, for example in a disperser which is capable of making the suspension homogeneous and disintegrating the fibre bundles. For this pre-processing, for example an Atrex disperser can be used, whereby the suspension is continuously subjected to impacts from opposite directions. After this, homogenization of the pulp can be carried out in the above described ways.

A second series of tests was carried out for oxidized pulp (TEMPO mediated oxidization) by applying the same homogenizer and analysis methods, but the starting pulp was TEMPO oxidized birch pulp whose charge number was 1.02 mmol/g. This pulp also had a higher DP (degree of polymerization) than the pulp in the first series of tests, which has a favourable effect on the gel strength.

Figure 2:
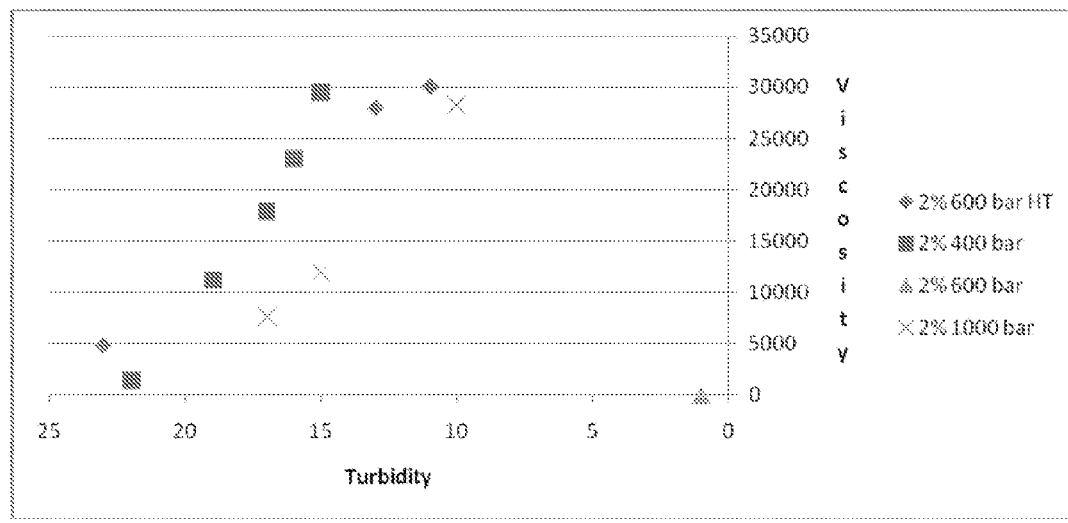
FIG. 2 shows the effect of homogenization pressure on the development of turbidity and viscosity at the same homogenization consistency, when the number of passes is increased.

In the test series, homogenization runs were passed at different consistencies at the same homogenization pressure of 600 bar (FIG. 1) and at the same consistency at different homogenization pressures (FIG. 2). The graphs show the development of turbidity (horizontal axis, NTU) and Brookfield viscosity (vertical axis, mPa·s) of the same pulp homogenized, with an increasing number of passes through. FIG. 1 shows how the pulp used did not, in practice, show differences when the consistency was increased from 1% to 2%. In view of the productivity, it is thus more advantageous to run at a consistency of 2%. When the homogenization consistency was 3%, the viscosity was increased more slowly, but nevertheless a value exceeding 20,000 mPa·s was achieved with three passes, whereas the development of viscosity at the consistency of 4% was poor. FIG. 2 shows that at the consistency of 2%, a pressure increase from 600 bar to 1000 bar no longer improved the result. The same could be found when the pressure was 800 bar (not shown in the graph). When the pressure was 400 bar, one more pass was needed (totaling 3) for a viscosity exceeding 10,000 or 15,000 mPa·s, and 2 more passes (totaling 4) for a viscosity exceeding 20,000 mPa·s, compared with the pressure of 600 bar. In FIG. 2, HT refers to a higher starting temperature, 40° C., in homogenization; otherwise, the starting temperature was the room temperature. The higher starting temperature had an advantageous but not significant effect on the fibrillation. With an increasing number of passes, the temperature also naturally increases from the starting temperature as part of the homogenization energy is converted to heat.

Figure 3:
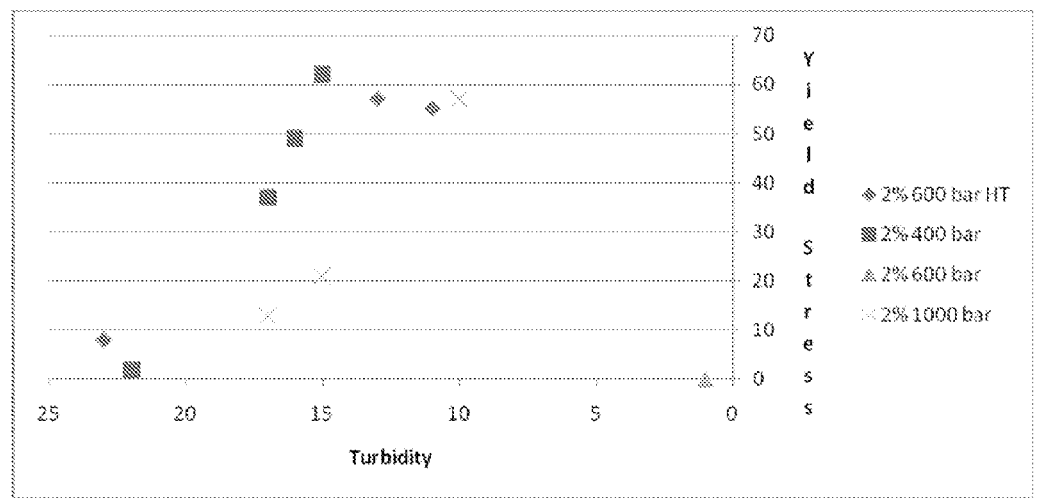
FIG. 3 shows the effect of homogenization pressure on the development of yield stress in the series of tests in FIG. 2, and FIGS. 4 and 5 show viscosity graphs on samples obtained by the method.

In the development of yield stress values in FIG. 3, differences between the homogenization pressures can be seen which are similar to those in FIG. 2.

Figure 4:
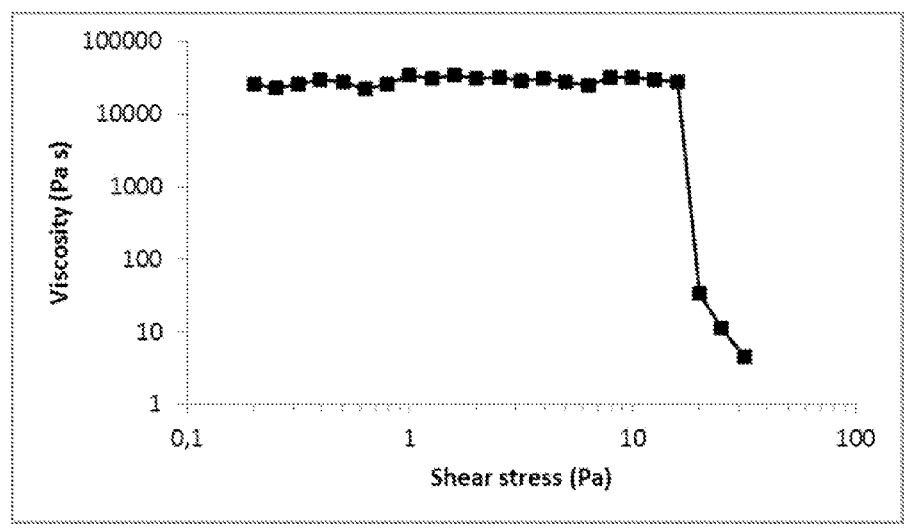

FIG. 4 shows further a typical rheometric curve of fibril cellulose. The curve has been obtained for carboxymethylated fibril cellulose of the first test series (0.71 mmol/g, 600 bar, 2 pass 2%) at a measuring consistency of 0.5%. The measurement was taken by diluting an NFC sample with deionized water to a consistency of 0.5%, and 200 g of this mixture was homogenized by a Büchi mixer (B-400, max 2100 W, Büchi Labortechnik AG, Switzerland) for 3×10 s. The viscosity of the NFC dispersions was measured at 22° C. by a stress controlled rotation rheometer (AR-G2, TA Instruments, UK) equipped with narrow gap vane geometry, diameter 28 mm, length 42 mm, in a cup with a diameter of 30 mm. After the sample had been introduced in the rheometer, it was allowed to rest for 5 min before the measurement was started. Steady state viscosity was measured by gradually increasing the shear stress (proportional to the moment used) and measuring the shear rate (proportional to the angular speed). The reported viscosity (shear stress/shear rate) under a given shear stress was recorded after achieving a constant shear rate or after a maximum time of 2 min. The measuring was stopped after exceeding the shear rate of 1000 s$^{-1}$.

In a third test, TEMPO mediated oxidized pulp (charge 0.82 mmol/g) was dispersed to a consistency of 1.6% and homogenized at 600 bar in 3 passes. The gel obtained can be characterized as follows:

Brookfield viscosity (0.8% measuring consistency, 10 rpm): 18,500 mPa·s

Yield-stress in Brookfield measurement: 29 Pa

Turbidity: 19 NTU.

Figure 5:
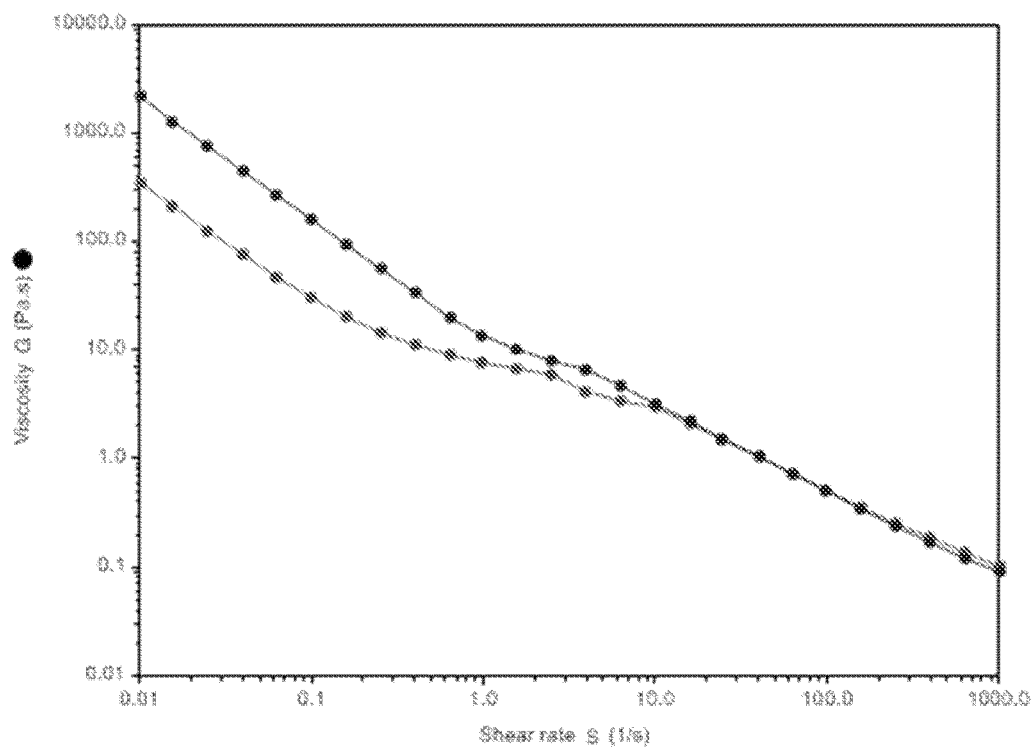

FIG. 5 shows the viscosity graph of the sample obtained from the third test, measured by a rheometer in a shear-rate controlled manner, and the viscosity is shown as a function of the shear rate. The measuring consistency was 0.8%. The lower curve at low shear rates (lower than 10/s) has been obtained with a measurement geometry of concentric cylinders, and the upper curve with a measurement geometry of a vane spindle.

In view of the productivity of the process and the final result, it is advantageous to apply a pressure of 300 to 650 bar and a consistency of 1.5 to 3.5% with 2 to 4 passes through. The pressure range can also be selected narrower, for example 320 to 575 bar or 350 to 450 bar.

As seen from the preceding results, good results are achieved at a pressure of 400 bar. With the above mentioned consistency values and passes through, it is also possible to apply the pressure ranges of 300 to 400 bar or 400 to 650 bar.

Consequently, the aim in the method is to obtain, after a sufficient number of homogenization passes, a fibril cellulose suspension which is a gel with strongly shear thinning properties, which are typical of fibril cellulose. Complete fibrillation of the fibres takes place as a function of energy consumption with an increasing number of passes through. Consequently, the viscosity of the product and the specific energy applied in the method have a positive correlation. Fibril cellulose can also be obtained by homogenization, whereby the turbidity and the content of fibre particles decrease as a function of specific energy (energy consumption). The proportion of non-disintegrated fragments of fibre wall contained in the fibril cellulose is measured by, for example, Fiberlab equipment.

The aim in the method is to obtain, as the final product, fibril cellulose that contains anionic cellulose, whose Brookfield viscosity, measured at a consistency of 0.8% and at a rotation speed of 10 rpm, is at least 10,000 mPa·s, advantageously at least 20,000 mPa·s. The viscosity of the fibril cellulose is advantageously in the range of 10,000 to 40,000 mPa·s, more advantageously 20,000 to 40,000 mPa·s. In addition to the high viscosity, the aqueous fibril cellulose dispersions obtained are also characterized by so-called shear thinning; that is, the viscosity decreases as the shear rate increases.

Furthermore, the aim is to obtain fibril cellulose whose turbidity is in the range of 10 to 60 NTU, measured by nephelometry at a consistency of 0.1 wt-% (aqueous medium). For example, a consistency in the range of 10 to 60 NTU is sufficient for many applications, and an increase in the number of passes and/or the homogenization pressure is not expedient to achieve absolute clarity.

Furthermore, the aim is obtain shear thinning fibril cellulose having a zero shear viscosity (shear stress viscosity; "plateau" of constant viscosity at small shearing stresses) in the range of 2,000 to 50,000 Pa·s and a yield stress (shear stress where shear thinning begins) in the range of 3 to 30 Pa, advantageously in the range of 6 to 15 Pa, measured at a consistency of 0.5% in water in a wide range of shear stress by rotation rheometer (AR-G2, TA Instruments, UK) by applying vane geometry.

It should be noted that in the definitions above, the consistencies refer to consistencies, at which the measurements are taken for determining product properties, and they are not necessarily consistencies of the product obtained by the method.

Thanks to its rheological properties, strength properties of the fibrils, as well as the translucency of the products made from it, the fibril cellulose obtained by the method can be applied in many uses, for example as a rheological modifier and a viscosity regulator, and as elements in different structures, for example as a reinforcement. Fibril cellulose can be used, among other things, as a rheological modifier and a sealing agent in oil fields. Similarly, fibril cellulose can be used as an additive in various medical and cosmetic products, as a reinforcement in composite materials, and as an ingredient in paper products. This list is not intended to be exhaustive, but fibril cellulose can also be applied in other uses, if it is found to have properties suitable for them.

The invention claimed is:

1. A method for fibrillation of cellulose, comprising the following steps:
   mechanically pre-processing fibre pulp of anionic cellulose in a disperser, the fibre pulp comprising carboxymethylated cellulose;
   introducing the pre-processed fibre pulp at a consistency of 1 to 4% into a homogenizer;
   homogenizing said pre-processed fibre pulp in the homogenizer, wherein the pre-processed fibre pulp is passed at a pressure of 200 to 1000 bar through a narrow throughflow gap, wherein the homogenization pressure is the pressure developed in the pre-processed fibre pulp before the gap due to the resistance caused by the gap, and by using 2 to 4 passes through for the same pre-processed fibre pulp under these conditions; and
   after said passes through, taking pulp from the homogenizer, which pulp has been fibrillated by homogenization to a degree than can be expressed as Brookfield viscosity exceeding 10,000 mPa·s at a measuring consistency of 0.8% and a rotation speed of 10 rpm.

2. The method according to claim 1, wherein the pulp has been fibrillated to a degree than can be expressed as Brookfield viscosity exceeding 15,000 mPa·s at a measuring consistency of 0.8% and a rotation speed of 10 rpm.

3. The method according to claim 1, wherein the pulp has been fibrillated to a degree that can be expressed as turbidity in the range of 10 to 60 NTU, measured by nephelometry at a consistency of 0.1 wt-% in an aqueous medium.

4. The method according to claim 1, wherein an amount of carboxyl groups in the carboxymethylated cellulose is 0.6 to 1.2 mmol/g.

5. The method according to claim 1, wherein the pre-processed fibre pulp is supplied at a consistency of 1.5 to 3.5% and homogenized at a pressure of 300 to 650 bar.

6. The method according to claim 5, wherein the pre-processed fibre pulp is supplied at a consistency of 1.5 to 2.5%.

7. The method according to claim 5, wherein the pre-processed fibre pulp is supplied at a consistency of 2.0 to 3.0%.

8. The method according to claim 1, wherein the mechanically pre-processing the fibre pulp includes mechanically disintegrating the fibre pulp.

9. The method according to claim 1, wherein the pulp has been fibrillated to a degree than can be expressed as Brookfield viscosity exceeding 20,000 mPa·s at a measuring consistency of 0.8% and a rotation speed of 10 rpm.

10. The method according to claim 1, wherein an amount of carboxyl groups in the carboxymethylated cellulose is 0.9 to 1.1 mmol/g.

11. The method according to claim 6, wherein the amount of carboxyl groups in the carboxymethylated cellulose is 0.6 to 1.2 mmol/g.

12. The method according to claim 7, wherein the amount of carboxyl groups in the carboxymethylated cellulose is 0.6 to 1.2 mmol/g.

13. The method according to claim 7, wherein the pulp has been fibrillated to a degree than can be expressed as Brookfield viscosity exceeding 15,000 mPa·s at a measuring consistency of 0.8% and a rotation speed of 10 rpm.

14. The method according to claim 6, wherein the pulp has been fibrillated to a degree than can be expressed as Brookfield viscosity exceeding 20,000 mPa·s at a measuring consistency of 0.8% and a rotation speed of 10 rpm.

15. The method according to claim 7, wherein the pulp has been fibrillated to a degree than can be expressed as Brookfield viscosity exceeding 20,000 mPa·s at a measuring consistency of 0.8% and a rotation speed of 10 rpm.

\* \* \* \* \*